(12) United States Patent
Regnier (10) Patent No.: US 7,804,854 B2
(45) Date of Patent: Sep. 28, 2010

(54) DIGITAL MESSAGE TRANSMISSION PROTOCOL

(75) Inventor: Laurent Regnier, Gieres (FR)

(73) Assignee: STMicroelectronics S.A., Montrouge (FR)

( * ) Notice: Subject to any disclaimer, the term of this patent is extended or adjusted under 35 U.S.C. 154(b) by 589 days.

(21) Appl. No.: 10/531,249

(22) PCT Filed: Oct. 15, 2002

(86) PCT No.: PCT/FR02/03521

§ 371 (c)(1),
(2), (4) Date: Apr. 14, 2005

(87) PCT Pub. No.: WO2004/036442

PCT Pub. Date: Apr. 29, 2004

(65) Prior Publication Data

US 2006/0109863 A1    May 25, 2006

(51) Int. Cl.
H04J 3/24    (2006.01)
(52) U.S. Cl. ..................... 370/474; 714/100
(58) Field of Classification Search .......... 370/321, 370/337, 347, 442
See application file for complete search history.

(56) References Cited

U.S. PATENT DOCUMENTS

| | | | |
|---|---|---|---|
| 5,237,684 A | 8/1993 | Record et al. | |
| 5,621,663 A | 4/1997 | Skagerling | |
| 5,729,530 A * | 3/1998 | Kawaguchi et al. | 370/236 |
| 5,822,321 A * | 10/1998 | Petersen et al. | 370/474 |
| 5,933,435 A * | 8/1999 | Shah et al. | 370/232 |
| 5,996,092 A | 11/1999 | Augsburg et al. | |
| 6,167,536 A | 12/2000 | Mann | |
| 6,332,117 B1 | 12/2001 | Berry et al. | |
| 6,467,083 B1 | 10/2002 | Yamashita | |

(Continued)

FOREIGN PATENT DOCUMENTS

EP    1 184 790 A2    3/2002

(Continued)

OTHER PUBLICATIONS

International Search report from corresponding Intn'l Application No. PCT/FR02/03521, filed Oct. 15, 2002.

(Continued)

Primary Examiner—Chirag G Shah
Assistant Examiner—Joshua Smith
(74) Attorney, Agent, or Firm—Lisa K. Jorgenson; James H. Morris; Wolf, Greenfield & Sacks, P.C.

(57) ABSTRACT

A method for transmitting digital messages used during testing of microprocessors. Each message includes at least one data packet. To transmit a message, each data packet is divided into successive segments of predetermined size, each segment being classified in accordance with one or the other among five types depending on whether it contains a start of message (SM), intermediate data (NT), an end of packet (EP), and end of message (EM); or it is an empty segment (ID). As each segment is sent, an identification signal characterizing the succession of the segment concerned and of the preceding segment is sent. To reduce the number of transmitted segments, a segment containing both the start and the end of a message is classified as being a segment containing an end of message, and a segment containing both the start of a message and the end of a first packet of the message being classified as a segment containing an end of packet.

19 Claims, 5 Drawing Sheets

U.S. PATENT DOCUMENTS

| | | | |
|---|---|---|---|
| 6,519,766 B1 | 2/2003 | Barritz et al. | |
| 6,625,165 B1 * | 9/2003 | Krishnamoorthy et al. | 370/474 |
| 6,847,637 B1 * | 1/2005 | Abiven | 370/360 |
| 2001/0046220 A1 * | 11/2001 | Koo et al. | 370/335 |
| 2003/0035440 A1 | 2/2003 | Casaccia et al. | 370/473 |
| 2003/0091056 A1 * | 5/2003 | Paul Hulme Walker et al. | 370/419 |
| 2003/0169769 A1 * | 9/2003 | Ho et al. | 370/473 |
| 2004/0213291 A1 * | 10/2004 | Beshai et al. | 370/474 |

OTHER PUBLICATIONS

International Search report from related Intn'l Application No. PCT/FR02/03723, filed Oct. 29, 2002.

International Search report from related Intn'l Application No. PCT/FR02/03526, filed Oct. 15, 2002.

International Search report from related Intn'l Application No. PCT/FR02/03725, filed Oct. 29, 2002.

International Search report from related Intn'l Application No. PCT/FR02/03724, filed Oct. 29, 2002.

Plauger, D., *Real-Time Unix: Timing is Everything*, Mini Micro Systems, Cahners Publishing CY, Boston, vol. 22, No. 2, Feb. 1, 1989, pp. 72-76, XP000039292.

Nexis 5001 Forum: *Standard for a Global Embeded Processor Debug Interface*, Dec. 15, 1999, IEEE-ISTO XP002247195.

* cited by examiner

DIGITAL MESSAGE TRANSMISSION PROTOCOL

BACKGROUND OF THE INVENTION

1. Field of the Invention

The present invention relates to the testing of microprocessors. It more specifically relates to a method and device of digital data transmission between a monitoring circuit integrated in a microprocessor chip and an analysis tool.

2. Discussion of the Related Art

Figure 1:
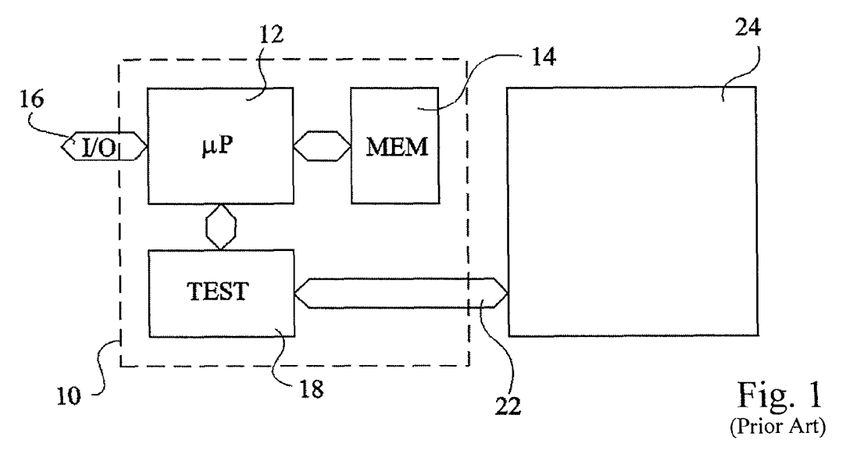
FIG. 1, previously described, schematically shows an integrated circuit provided with a monitoring device.

FIG. 1 schematically shows an integrated circuit 10 comprising a microprocessor (μP) 12, an internal memory (MEM) 14, and input/output terminals (I/O) 16. Microprocessor 12 is intended to execute a program or a software stored in memory 14. Under control of the program, microprocessor 12 may process data provided by input/output terminals 16 or stored in memory 14 and read or write data through input/output terminals 16.

To check the proper operation of the microprocessor, a monitoring circuit 18 (TEST) is generally integrated on integrated circuit 10. Monitoring circuit 18 is capable of reading specific data provided by microprocessor 12 on execution of a program, and of possibly processing the read data. Test terminals 22 connect monitoring circuit 18 to an analysis tool 24. Analysis tool 24 may process the received signals, for example, according to commands provided by a user, and ensure a detailed analysis of the operation of microprocessor 12. In particular, analysis tool 24 may determine the program instruction sequence really executed by microprocessor 12.

The number of test terminals 22 may be on the same order of magnitude as the number of input/output terminals 16, for example, from 200 to 400 terminals. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is produced in small quantities to debug the program of microprocessor 12 or "user program". After this debugging, a version of integrated circuit 10 without monitoring circuit 18 and of test terminals 22 is sold. This requires forming of two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the cost of the monitoring circuit. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12, to only transmit messages having an important information content.

Thus, standard IEEE-ISTO-5001 in preparation provides, in its 1999 version, accessible, for example, on website www.ieee-isto.org/Nexus5001, a specific message exchange protocol between a monitoring circuit and an analysis tool for a monitoring circuit 18 requiring but a reduced number of test terminals 22.

The monitoring circuit is provided to monitor the microprocessor operation and to provide the test terminals with predetermined messages only when certain predetermined instructions are executed. The messages may indicate how many instructions have been executed since the previous message. Messages may also be provided to indicate that certain predetermined points of the program have been reached. The analysis tool is provided to reconstitute the microprocessor operation, that is, the program execution in the microprocessor, based on the received messages and on the program code. The list of the message types and their structure are described in section 6 of standard IEEE-ISTO-5001. Each message is divided into packets of variable size and comprises at least one packet. In each packet, the bits are classified from left to right by order of increasing significance. Standard IEEE-ISTO-5001 provides that a message can comprise packets of a size which is either set by the standard or variable (set by the user). For simplicity, it is considered hereafter that a packet of variable size may comprise one or several packets, not shown, of fixed size.

To limit the number of test terminals, each packet is divided into segments of n bits, where n for example ranges between 4 and 16, transmitted by an n-bit MDO bus. The n least significant bits of the first data packet of the message are copied bit by bit into a first segment, after which the n remaining least significant bits of the data packet are copied bit by bit into a second segment, and so on until each bit in the packet has been copied. The unused most significant bits of the last segment thus formed receive a predetermined value, for example, 0. Each data packet is, as previously, divided into segments. The segments are sequentially transmitted by bus MDO, at the rate of a clock signal, not shown, specific to the monitoring circuit. To enable reconstruction of the data packets from the segments, it is provided to transmit with each segment on additional test terminals a code MSEO which enables the analysis tool to identify the nature of the data contained in the segment. Standard IEEE-ISTO-5001 provides codes MSEO for identifying that a segment contains: a message start (segment SM), intermediary data (segment NT), a packet end (segment EP), a message end (segment EM), or that this segment is an empty segment (segment ID) corresponding to an idle period between two messages.

Rather than directly identifying each segment by a specific code, which would require at least three bits, standard IEEE-ISTO-5001 provides giving code MSEO a specific value which, if the type of the preceding segment is known, enables determining the type of the transmitted segment. The MSEO code identifies the transition between the preceding code and the transmitted segment.

Figure 2:
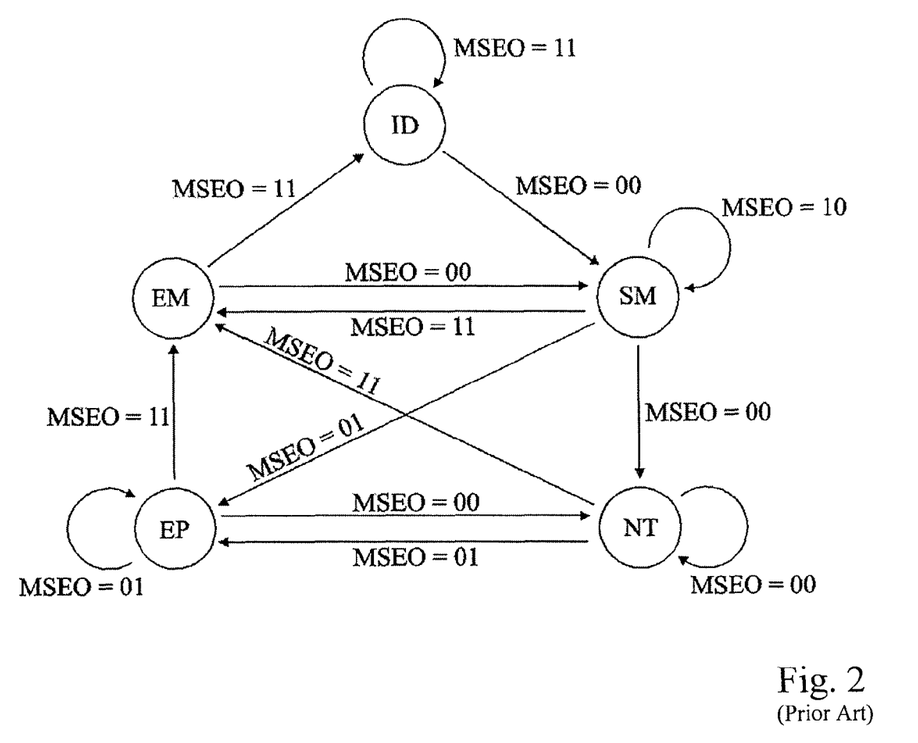
FIG. 2, previously described, illustrates a message transmission protocol such as defined in the 1999 version of standard IEEE-ISTO-5001.

FIG. 2 schematically illustrates all the possible successions of segments provided by standard IEEE-ISTO-5001. The circles bearing references SM, NT, EP, EM, and ID each represent a transmitted segment type. The arrows joining two circles indicate that the two corresponding segments can be transmitted one after the other. An arrow starting from a circle to return thereto indicates that a segment of this type can be transmitted several times in a row. For example, a segment SM can follow a segment SM. This indicates that the sent message is very short and comprises a single packet of a length shorter than or equal to one segment. In other words, first segment SM contains both the start and the end of a message. A segment SM can be transmitted after a segment SM, EM, or ID, and a segment ID can be transmitted after a segment EM or ID. Similarly, a segment NT or EM can be transmitted after a segment SM, NT, or EP. Finally, a segment EP can be transmitted after a segment SM, NT, or EP.

FIG. 2 also illustrates the value taken by code MSEO according to the type of transmitted segment and to the preceding segment type. The MSEO code value associated with each transmitted segment is the value associated with the arrow going from the previous segment to the transmitted segment. A segment SM is identified by a value 00 of code MSEO if the previous segment was an EM or ID segment, and it is identified by a value 10 if the previous segment was an SM segment. A segment NT is identified by a value 00 of code MSEO whatever the previous segment. A segment EP is identified by a value 01 of code MSEO whatever the previous segment. A segment of EM or ID type is identified by a value 11 of code MSEO whatever the previous segment.

On reception of the segments, the analysis tool reconstitutes the packets of each message by arranging end-to-end the segments containing the data of a same packet.

Figure 3A:
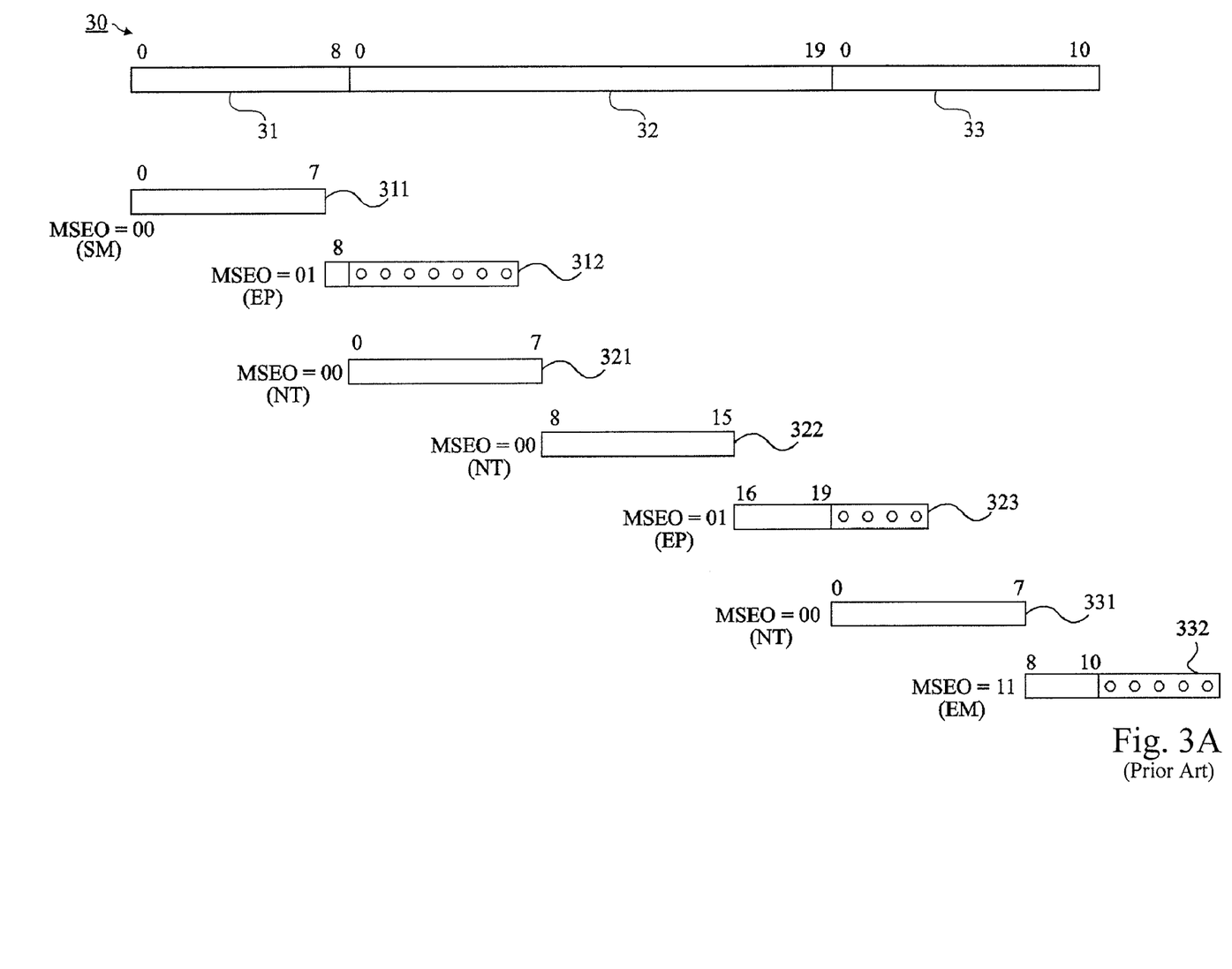
FIGS. 3A and 3B illustrate an example of transmission of a message according to the protocol of FIG. 2 for two different MDO bus sizes.

FIG. 3A illustrates as an example the transmission of a message 30 comprising three packets 31, 32, and 33 respectively having 9, 20, and 11 bits. FIG. 3A also illustrates the MSEO code which is transmitted with each segment of message 30. To transmit message 30 over a bus MDO of n=8 bits, the first packet 31 is divided into a first message start segment 311 (MSEO=00 assuming that the previous segment was a segment ID) containing the 8 least significant bits of packet 31 and a second packet end segment 312 (MSEO=01) containing the most significant bit of packet 31, followed by 7 zeros. Similarly, packet 32 is divided into three segments 321 (of type NT, MSEO=00), 322 (of type NT, MSEO=00), and 323 (of type EP, MSEO=01) respectively containing the 8 least significant bits, the 8 next least significant bits, and the 4 most significant bits of packet 32, followed by 4 zeros. Packet 33 is divided into two segments, 331 (of type NT, MSEO=00) and 332 (of type EM, MSEO=11) respectively containing the 8 least significant bits and the 3 most significant bits of packet 33, followed by 5 zeros.

SUMMARY OF THE INVENTION

An object of the present invention is to optimize the previously-described message transmission method to reduce the number of transmitted segments in various specific cases.

Another object of the present invention is to provide a device enabling implementation of such a method.

To achieve these and other objects, the present invention provides a method for transmitting, between a monitoring circuit integrated to a microprocessor and an analysis tool, digital messages each comprising at least one data packet, comprising the steps of:

a/ dividing each data packet into successive segments of same predetermined size, each segment being classified according to one or the other of the five following types of segment:

segment containing a message start;
segment containing intermediary data;
segment containing a packet end;
segment containing a message end; or
empty segment;

b/ sending at the same time as each segment an identification signal characterizing the type difference between the considered segment and the previous segment; and c/ reconstituting the packets of each message by arranging end to end the segments containing data of a same packet;

in which a segment containing both the start and the end of a message is classified as being a segment containing a message end, and a segment containing both the start of a message and the end of a first packet of the message is classified as being a segment containing a packet end.

According to an embodiment of the present invention, a segment containing a message start or an empty segment may be transmitted after a segment containing a message end or an empty segment;

a segment containing intermediary data may be transmitted after a segment containing a message start or intermediary data or a packet end; and a segment containing a packet end or a message end may be transmitted after a segment of any type.

According to an embodiment of the present invention, the identification signal has:

a first value if the transmitted segment contains a message start or intermediary data;

a second value is the transmitted segment contains a packet end;

a third value if the transmitted segment contains a message end and if the previous segment contained a message end or was an empty segment; and a fourth value if the transmitted segment is empty, or if the transmitted segment contains a message end and if the previous message contained a message start, intermediary data, or a packet end.

The present invention also aims at a device for transmitting, between a monitoring circuit integrated to a microprocessor and an analysis tool, digital messages, each of which comprises at least one data packet, comprising:

a means for dividing each data packet into successive segments of same predetermined size, each segment being classified according to one or the other of the five following segment types:

segment containing a message start;
segment containing intermediary data;
segment containing a packet end;
segment containing a message end; or
empty segment;

a means for sending at the same time as each segment an identification signal characterizing the type difference between the considered segment and the previous segment; and a means for reconstituting the packets of each message by arranging end to end the segments containing data of a same packet;

in which the means for dividing each data packet classifies a segment containing both the start and the end of a message as being a segment containing a message end, and classifies a segment containing both the start of a message and the end of a first packet of the message as being a segment containing a packet end.

BRIEF DESCRIPTION OF THE DRAWINGS

The foregoing and other objects, features, and advantages of the present invention will be discussed in detail in the following non-limiting description of specific embodiments in connection with the accompanying drawings, among which.

DETAILED DESCRIPTION

The inventor has analyzed the operation of the previously-described message transmission system in the case where bus MDO has a data width n equal to or greater than the size of the first, and possible single, data packet of each message.

Figure 3B:
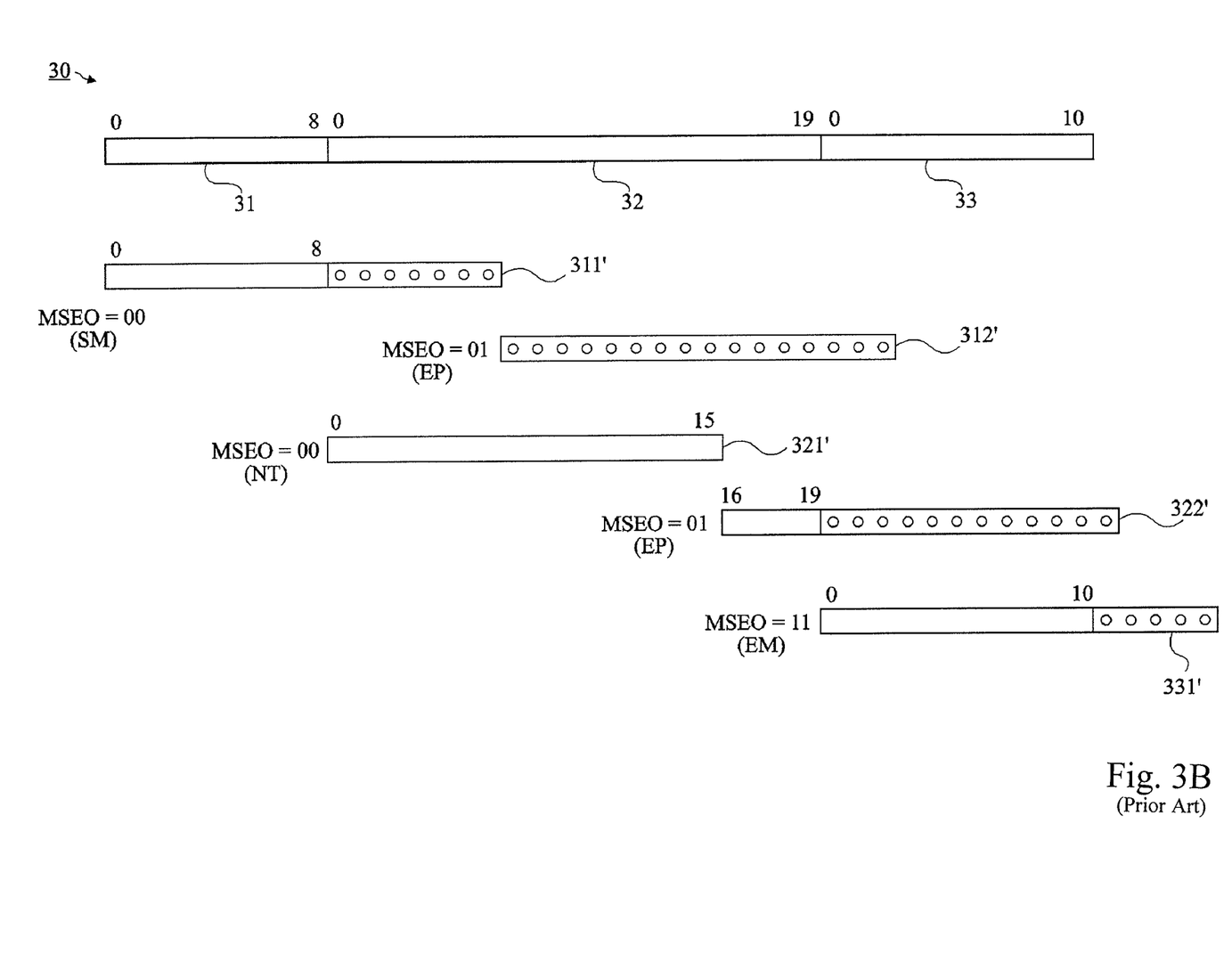

FIG. 3B illustrates the transmission of message 30 of FIG. 3A and the segments used to transmit such a message over a bus MDO of n=16 bits. A single segment 311' contains the 9 bits of the first packet 31 followed by 7 zeros, and this segment is associated with a message start code (MSEO=00). Since the protocol does not provide the possibility of indicating that the end of the first packet has been sent in this same segment, a next packet end segment 312' associated with a code MSEO=01 must be transmitted, which contains only zeros, before being able to transmit segments of the next packet. The next packet, 32, is then divided into an NT-type segment 321' (MSEO=00) and an EP-type segment 322' (MSEO=01) respectively containing the 16 least significant bits and the 4 most significant bits of packet 32 followed by 12 zeros. Packet 33 is transmitted in a single message end segment 331' (MSEO=11) containing its 11 bits followed by 5 zeros.

Generally, when the first packet of a message having several packets has a size smaller than or equal to the size n of bus MDO, this first packet must, according to the preceding protocol, be transmitted in two segments. The transmission of the second segment, which contains no data, uselessly monopolizes the test terminals and reduces the bandwidth of bus MDO.

The present invention aims at a method for transmitting messages in segments in which a segment containing both the start of a message and the end of a first, and possibly single, packet of the message may be immediately followed by a segment containing data, for example, the start of a second packet of the message or the start of a new message.

Figure 4:
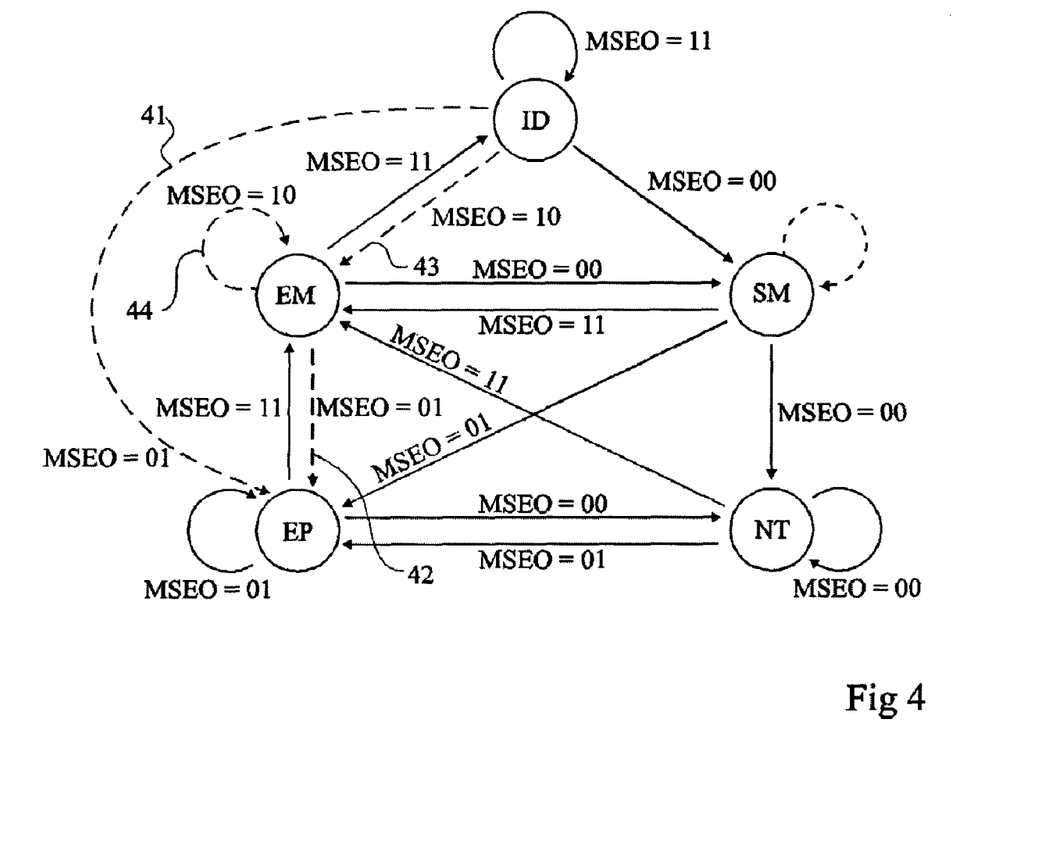
FIG. 4 illustrates a message transmission protocol according to the present invention.

FIG. 4 illustrates a protocol for transmitting messages in segments according to the present invention. FIG. 4 uses same references as those used to identify the different segments in FIG. 2. FIG. 4 exhibits with respect to FIG. 2 differences which will now be described in relation with the arrows drawn in dotted lines.

According to the present invention, a segment is classified as being of type EP not only if it only contains a packet end, but also if it contains both the start of a message of several packets and the end of the first packet of the message. This last case occurs if the first packet of a message is shorter than a segment. Such a message start and packet end segment EP may follow an empty segment ID when such a message start is transmitted after an idle period (arrow in heavy dotted lines 41) or a segment EM when such a message start is transmitted after the end of a previous message (arrow in heavy dotted lines 42).

According to the present invention, a segment is classified as being of type EM not only if it only contains a message end, but also if it both contains the start and the end of a message. This last case occurs if a message is shorter than a segment. Such a message start and end segment EM may follow a segment ID when a short message is transmitted after an idle period (arrow in heavy dotted lines 43) or a segment EM when a short message is transmitted immediately after a previous message (arrow in heavy dotted lines 44).

The possibility of classifying a segment as being of type EM if it contains both the start and the end of a message replaces the possibility, provided by the protocol of FIG. 2, of classifying such a segment as being of type SM. Thus, according to the present invention, a segment SM can no longer follow a segment SM (and thereby indicate that the first segment SM contains a message shorter than a segment).

In FIG. 4, a segment EP is identified by a value 01 of the MSEO code whatever the previous segment. A segment EM is identified either by a value 11 of the MSEO code if the previous segment was a segment SM, NT, or EP, or by a value 10 of the MSEO code if the previous segment was a segment EM or ID. Segments SM, NT, and ID are identified in the same way as described previously.

The present invention may be implemented in a device such as shown in FIG. 1 by those skilled in the art acquainted with section 8 of the 1999 version of standard IEEE-ISTO-5001. For this purpose, monitoring circuit 18 and analysis tool 24 will be programmed according to the protocol of FIG. 4.

Figure 5:
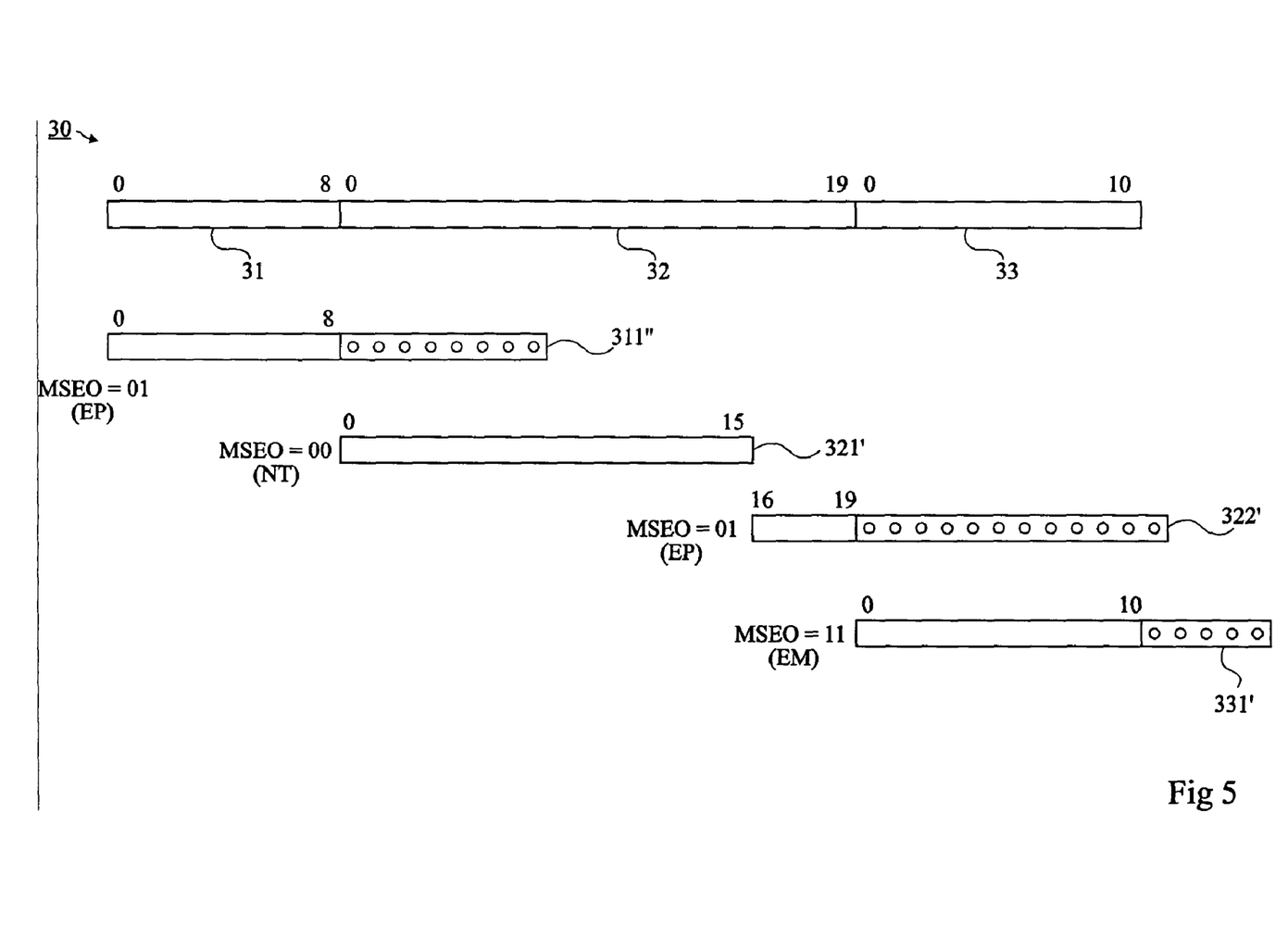
FIG. 5 illustrates the message transmission of FIG. 3B according to the protocol of FIG. 4.

FIG. 5 illustrates the transmission of the same message 30 as that illustrated in FIG. 3B by the MDO bus of n=16 bits according to the protocol of FIG. 4. A single segment 311" of type EP contains the 9 bits of the first packet 31 followed by 7 zeros. This segment 311" is followed by the same segments 321', 322' and 331' as those described in relation with FIG. 3B. With segment 311" is transmitted an MSEO code having value 01, and with segments 321', 322', and 331' are transmitted, as previously, MSEO codes having values 00, 01, and 11.

The present invention enables in the example illustrated in FIG. 5 transmitting in four segments a message which, in same conditions, should be transmitted in five segments according to the protocol of FIG. 2.

In the case of messages comprising two packets, each having a size smaller than or equal to a segment, the present invention enables sending two segments only instead of three.

The present invention further enables especially transmitting in two segments only (one segment EM and one segment EP) the succession of a message of a length smaller than a segment and of a first packet of a length smaller than a segment of a next message. Such a succession would have been transmitted in four segments (a segment SM followed by segments EM, SM, and EP) according to the protocol of FIG. 2.

Of course, the present invention is likely to have various alterations, modifications, and improvements which will readily occur to those skilled in the art. In particular, the present invention has been described in relation with a transmission of messages from the monitoring circuit to the analysis tool, but it similarly applies to a transmission of messages in the reverse direction.

Further, the present invention has been described in relation with specific values of the MSEO code, but these values may be modified or inverted.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting, between a monitoring circuit integrated with a microprocessor and an analysis tool, digital messages, each message comprising at least one data packet, the method comprising:

a/ for each message of the digital messages, dividing each data packet of a digital message into at least one successive segments of a same predetermined size, each segment of the successive segments being classified according to at least one of the five following types of segments:

a first type of segment, each segment classified as the first type containing a message start;

a second type of segment, each segment classified as the second type containing intermediary data;

a third type of segment, each segment classified as the third type containing a packet end;

a fourth type of segment, each segment classified as the fourth type containing a message end; or a fifth type of segment, each segment classified as the fifth type being an empty segment;

b/ sending, by the monitoring circuit, at a same time as each segment of the successive segments, an identification signal characterizing a type difference between a considered segment and a previous segment; and c/ reconstituting, by the analysis tool, the packets of the digital message by arranging end to end the successive segments containing data of a same packet;

wherein a segment of the successive segments having both the start and the end of the digital message is classified as the fourth type of segment, and wherein, if the message that includes at least one data packet comprises a plurality of data packets and if a segment of the successive segments has both the start of the digital message and the end of a first packet among the plurality of packets of the digital message, the segment is classified as the third type of segment.

2. The method of claim 1, comprising:

transmitting a segment containing a message start or an empty segment after a segment containing a message end or an empty segment;

transmitting a segment containing intermediary data after a segment containing a message start or intermediary data or a packet end; and transmitting a segment containing a packet end or a message end after a segment of any type.

3. The method of claim 2, comprising assigning the identification signal:

a first value if the transmitted segment contains a message start or intermediary data;

a second value if the transmitted segment contains a packet end;

a third value if the transmitted segment contains a message end and if the previous segment contained a message end or was an empty segment; and a fourth value if the transmitted segment is empty, or if the transmitted segment contains a message end and if the previous digital message contained a message start, intermediary data, or a packet end.

4. A system for transmitting, between a monitoring circuit integrated to a microprocessor and an analysis tool, digital messages, each digital message comprises at least one data packet, the device comprising:

means for dividing each data packet of a digital message into at least one successive segments of same predetermined size, each segment of the successive segments being classified according to at least one of the five following segment types:

segment containing a message start;
segment containing intermediary data;
segment containing a packet end;
segment containing a message end; or
empty segment;

means for sending at the same time as each segment of the successive segments, an identification signal characterizing the type difference between a considered segment and a previous segment; and means for reconstituting the packets of the digital message by arranging end to end the successive segments containing data of a same packet;

wherein the means for dividing each data packet classifies a segment of the successive segments having both the start and the end of the digital message is classified as a message end segment, and wherein, if the message that includes at least one data packet comprises a plurality of data packets and if a segment of the successive segments has both the start of the digital message and the end of a first packet among the plurality of packets of the digital message, the segment is classified as being a packet end segment.

5. The system of claim 4, wherein the identification signal has:

a first value if the transmitted segment contains a message start or intermediary data;

a second value if the transmitted segment contains a packet end;

a third value if the transmitted segment contains a message end and if a prior segment contained a message end or was an empty segment; and a fourth value if the transmitted segment is empty, or if the forth segment contains a message end and if a second prior message contained a message start, intermediary data, or a packet end.

6. The system of claim 4, wherein unused most significant bits of a last segment are assigned a predetermined value.

7. The method of claim 1, further comprising assigning a predetermined value to unused most significant bits of a last segment.

8. A method for transmitting, between a monitoring circuit integrated with a microprocessor and an analysis tool, at least one digital message comprising at least one data packet, comprising:

dividing the at least one data packet into a plurality of segments comprising at least a first segment and a second segment, each of the plurality of segments being of a predetermined size and being classified according to at least one of the five following types of segment:

segment containing a message start;
segment containing intermediary data;
segment containing a packet end;
segment containing a message end; or
empty segment; and sending from the integrated circuit to the analysis tool in sequence the first segment followed by the second segment without an intervening segment, wherein the first segment is classified as either an empty segment or a message end segment and the second segment is classified as a packet end segment, and wherein each segment containing a message end is classified as a message end segment.

9. The method of claim 8, wherein the first segment is classified as a message end and the second segment is classified as a message end.

10. The method of claim 8, wherein the first segment is classified as an empty segment and the second segment is classified as a packet end.

11. The method of claim 8, wherein the first segment is classified as a message end and the second segment is classified as a packet end.

12. The method of claim 8, wherein the first segment is classified as an empty segment and the second segment is classified as a message end.

13. The method of claim 8, further comprising sending from the integrated circuit to the monitoring tool a third segment of the plurality of segments, wherein the third segment is classified as message start.

14. The method of claim 13, further comprising sending from the integrated circuit to the monitoring tool a fourth segment of the plurality of segments, wherein the fourth segment is classified as intermediary data.

15. The method of claim 9, further comprising sending from the integrated circuit to the monitoring tool a third segment of the plurality of segments, wherein the third segment is classified as message start.

16. The method of claim 15, further comprising sending from the integrated circuit to the monitoring tool a fourth segment of the plurality of segments, wherein the fourth segment is classified as intermediary data.

17. The method of claim 10, further comprising sending from the integrated circuit to the monitoring tool a third segment of the plurality of segments, wherein the third segment is classified as message start.

18. The method of claim 17, further comprising sending from the integrated circuit to the monitoring tool a fourth segment of the plurality of segments, wherein the fourth segment is classified as intermediary data.

19. The method of claim 11, further comprising sending from the integrated circuit to the monitoring tool a third segment of the plurality of segments, wherein the third segment is classified as message start.

* * * * *

UNITED STATES PATENT AND TRADEMARK OFFICE
CERTIFICATE OF CORRECTION

PATENT NO. : 7,804,854 B2 Page 1 of 1
APPLICATION NO. : 10/531249
DATED : September 28, 2010
INVENTOR(S) : Laurent Regnier It is certified that error appears in the above-identified patent and that said Letters Patent is hereby corrected as shown below:

Col. 1, line 42, should read:
forming two versions of the integrated circuit, which Signed and Sealed this Sixteenth Day of November, 2010

David J. Kappos
*Director of the United States Patent and Trademark Office*